UNITED STATES PATENT OFFICE.

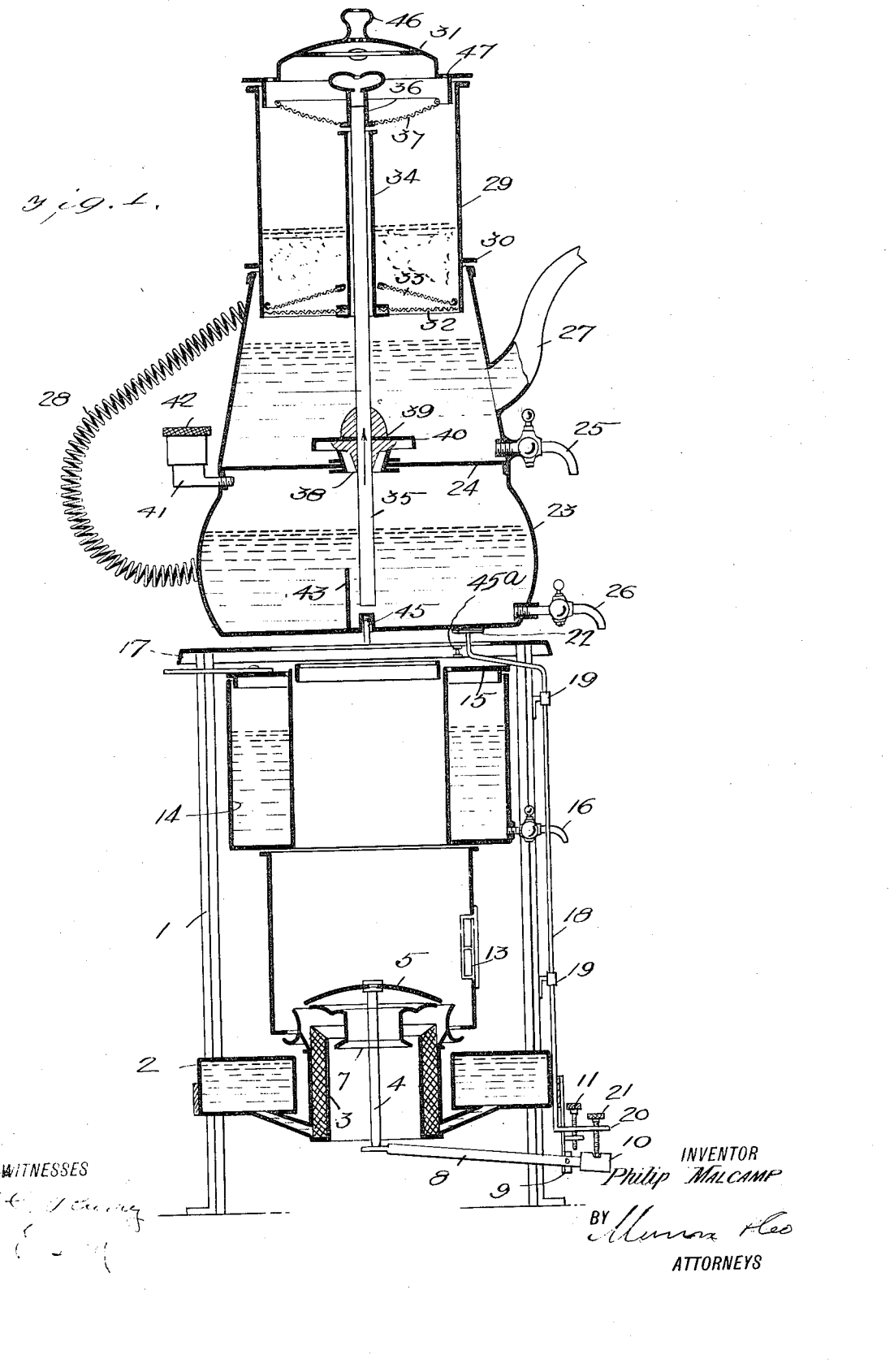

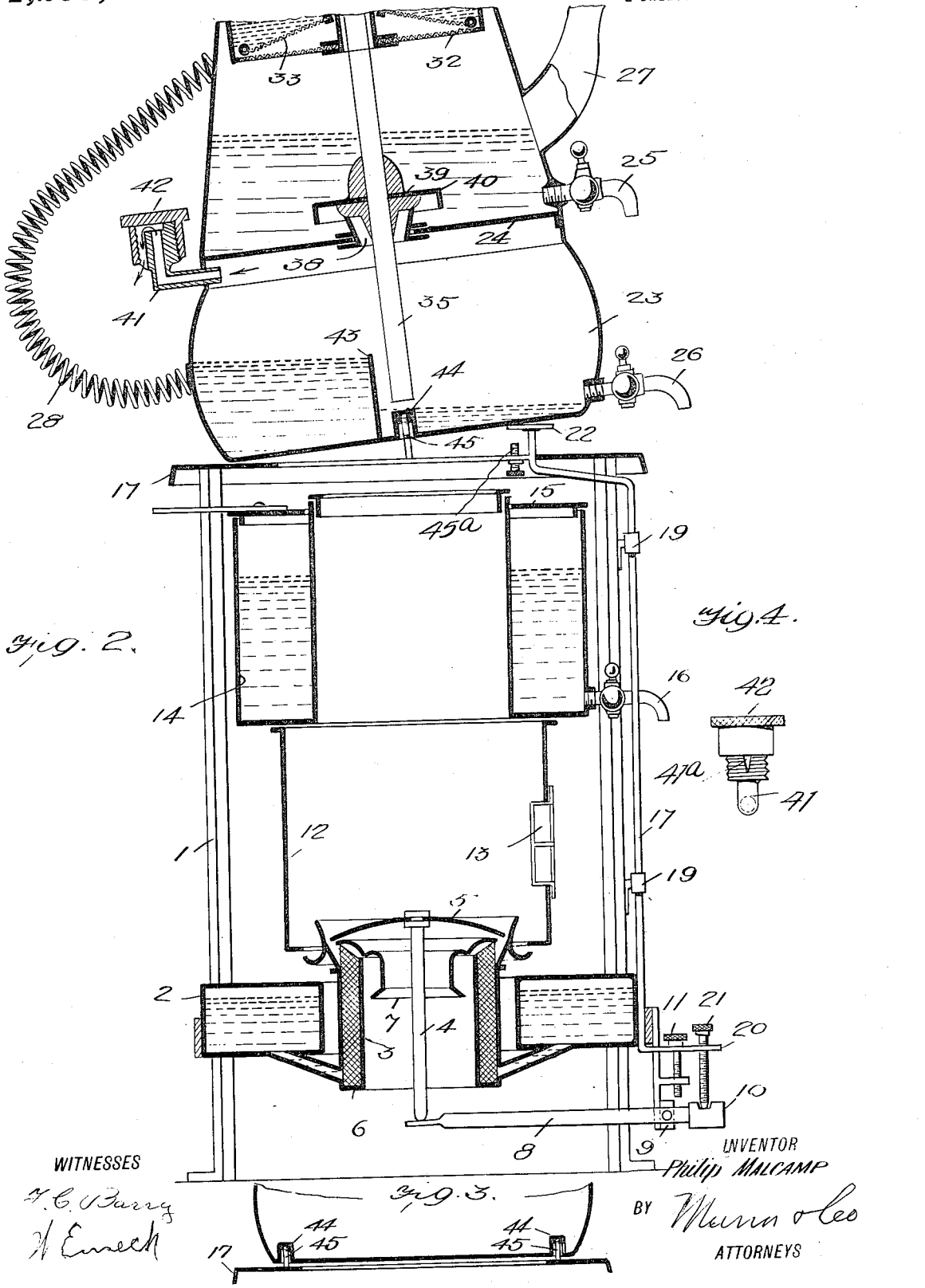

PHILIP MALCAMP, OF NEW ORLEANS, LOUISIANA.

PERCOLATOR.

1,259,257. Specification of Letters Patent. Patented Mar. 12, 1918.

Application filed November 8, 1916. Serial No. 130,179.

*To all whom it may concern:*

Be it known that I, PHILIP MALCAMP, a citizen of France, and a resident of New Orleans, in the parish of Orleans and State of Louisiana, have invented an Improvement in Percolators, of which the following is a specification.

My invention is an improvement in percolators, and has for its object to provide a device of the character specified in connection with a heater, wherein the arrangement is such that when the operation of making coffee is complete, the burner will be extinguished, and a signal will be sounded, to notify the housekeeper that the coffee is completed, and wherein the operation is entirely automatic, being brought about by the completing of the operation of coffee making.

In the drawings:

Figure 1 is a vertical section through the improved percolator and heater showing the parts in one position.

Fig. 2 is a similar view showing the parts in another position.

Fig. 3 is a front view of the outlet valve.

Fig. 4 is a front view of the safety valve.

In the present embodiment of the invention a heater is provided comprising a suitable frame 1, having an annular tank or reservoir 2 for oil, and a wick tube 3 is arranged within the reservoir, the outer wall of the wick tube being spaced apart from the inner wall of the reservoir. A rod 4 is mounted to move vertically at the axis of the wick tube, and this rod carries at its upper end a concavo-convex damper 5 which is secured to the rod, being arranged with its convex surface upward, and being of a diameter to extend beyond the wick 6, as shown.

A tubular member 7 is connected with the rod below the damper, and this tubular member has an outwardly extending flange, which extends to near the edge of the damper 5. The lower end of the rod, which has guided movement with respect to the wick tube, rests upon the inner end of a lever 8 which is pivoted to a bracket 9 depending from the frame. This lever carries a counter-weight 10 at its outer end, and a set screw 11 is threaded through a lateral extension from the bracket, for limiting the upward swinging movement of the outer end of the lever. A chimney 12 encircles the wick tube in spaced relation, the said chimney having the usual observation opening covered by a sheet of transparent material indicated at 13, and at the upper end of this chimney is arranged an annular water tank 14, the said tank having a removable cover 15, and a discharge faucet 16, for permitting the withdrawal of the contents of the reservoir. The cover has a handle as shown, for convenience in removing the same, and a supporting plate 17 for the percolator, to be described, is directly above the reservoir.

A rod 18 is mounted to move vertically in bearings 19 on the frame, and the other end of this rod, is bent laterally outward as indicated at 20, and is provided with a set screw 21 which engages the counter-weight 10 before-mentioned. The upper end of the rod is bent laterally inward and upward and extends through an opening in the plate 17, and is provided with a head 22 which the percolator, to be described, may engage when the percolator is in place on the plate. When the percolator is in place under normal conditions, the head 22 will be depressed, and the lever 18 will be swung in a direction to lift the damper 5—7, so that it will not interfere with the flame of the wick.

The percolator comprises a body portion 23, having a transverse partition 24, dividing the said body into two compartments, and valves 25 and 26 are provided for the several compartments, the valves being near the bottoms of the compartments. The uppermost compartment is also provided with a spout 27 and a handle 28 of spiral wire is connected with the body, for convenience in handling the same.

The coffee holder indicated at 29 sets within the upper end of the body, the said holder having an annular rib 30 for engaging the top of the body to hold the coffee holder in proper position, and the said holder is provided with a cover 31. The bottom of the holder 29 is closed by screens 32 and 33, the former screen being plane while the latter is conical. A tube 34 is arranged at the axis of the holder 29, and the screens 32 and 33 are connected at their centers with the tube. A tube 35 extends upward through the partition 24 and through the tube 34 above the same, and at its upper end this tube is provided with a head 36, the said head fitting over the upper end of the tube and having at its top a whistle.

A concavo-convex screen 37 is connected to the head at the lower end, being arranged with its convex face downward, and the water discharged from the tube 35 is broken up and converted into spray by the screen 37, which is in fact a spray head.

A valve casing 38 is arranged in the partition 24 about the tube 35, said tube passing through the valve casing, and the tube is provided with a valve 39 which closes the casing, preventing the passage of the made coffee in the upper compartment to the lower compartment, but permitting the upward passage of steam in order to prevent damage to the percolator. This valve 39 is provided with a species of petticoat 40, which overhangs the valve casing and extends beyond the same to prevent the passage of coffee grounds and the like into the valve.

The lower compartment is provided with a species of safety valve, and automatic heat radiator, consisting of an elbow 41 having one arm extending into the compartment and the other extending upwardly, and a cap 42 is threaded onto the upwardly extending arm. The upwardly extending portion is provided with a passage which leads from the lower edge of the cap to the top thereof and radially inward communicating with the bore of the elbow to provide an outlet for the compartment.

A partition 43 which may be of any desired height is arranged transversely of the lower compartment on the bottom thereof, and at one side of the tube 35. This partition is not central, but is nearer to the handle 28 than it is to the faucet 26. The bottom of the percolator is also provided with an inwardly extending nipple 44, near each end of the diameter which is parallel with the partition 43, and a screw 45 is engaged with each nipple, and these screws which are removable are of a length to prevent the percolator from setting flat on the plate 17. The cover 31 is provided with a tubular knob or handle 46, and this knob or handle is provided with an opening in its top, and the cover is provided with openings at the knob or handle, for permitting the passage of steam from the interior of the holder. The cover is also provided with other openings near its margin as indicated at 47 for the same purpose.

In operation the lower compartment is provided with water as indicated in Fig. 1, and the pulverized coffee is arranged within the holder. With the parts in the position of Fig. 1, the wick may be lighted, and it will burn. The water in the lower compartment becomes hot, and is driven up through the percolator pipe 35, passing out through the head and being sprayed onto the coffee by the element 37. This heated water percolates down through the coffee eventually reaching the upper compartment as coffee ready for drinking. As the process continues, that portion of the water which is on that side of the partition 43 adjacent to the tube 35 will be drawn up until but a slight portion will remain in the said portion of the lower compartment. That portion of the water, however, on the other side of the partition 43 will remain, since it cannot pass up through the tube. It will be noted that the tube is spaced a slight distance above the bottom of the body, so that eventually the bottom of the tube will be uncovered by the water. When this occurs the steam generated may pass up freely through the tube 35 and the whistle in the head 36 will be sounded, notifying the housekeeper that the coffee is complete. At this time, however, the excess weight in the percolator adjacent to the handle 28 will tip the percolator into the position of Fig. 2, and the rod 17 will be moved upward by the weight of the damper on the inner end of the lever 8. The damper will move downward, and the flame of the wick will be extinguished. The water in the reservoir 14 already heated will retain the made coffee warm until the percolator is removed from the heater.

It will be noticed from an inspection of the drawing that the set screw 45ª is threaded through the element 17, forming a third leg upon which the percolator may rest when not tilted. Referring to Fig. 4 of the drawing it will be seen that the groove 41ª in the element 41 is V-shaped, so that the extent of the discharge through the groove may be varied. The farther down upon the element 41 the cap is screwed, the greater the extent of groove covered and the less the extent of opening for the escape of steam. When the cap is screwed entirely down, there will be no escape, and the water will be forced up through the tube 35.

It will be evident that by means of the cap 42 and the groove 41ª, the water may be forced up through the tube 35 at any desired predetermined temperature, from 120° to the boiling point.

I claim:

1. A percolator comprising a body portion having a false bottom spaced above the true bottom to form upper and lower compartments, a percolator tube extending through the false bottom, a valved connection between the tube and the false bottom and arranged to permit the upward passage of steam and prevent the downward passage of liquid, a coffee holder set in the body at the upper end and into which the percolator tube extends, said percolator body having a discharge faucet in each compartment, a whistle at the upper end of the percolator tube and adapted to be operated by the steam when the water below the false bottom is below the level of the percolator tube.

2. A percolator comprising a body portion having a false bottom spaced above the true bottom to form upper and lower compartments, a percolator tube extending through the false bottom, a valved connection between the tube and the false bottom and arranged to permit the upward passage of steam and prevent the downward passage of liquid, a coffee holder set in the body at the upper end and into which the percolator tube extends, said percolator body having a discharge faucet in each compartment.

3. A percolator mounted to tilt and having a false bottom dividing the percolator into upper and lower compartments, a percolator tube extending through the false bottom, said lower compartment having a transverse partition at one side of the percolator tube for preventing a portion of the water in the compartment from passing upward through the tube to cause the percolator to tilt when overbalanced by the said portion of water.

4. A percolator mounted to tilt and having a false bottom dividing the percolator into the upper and lower compartments, a percolator tube extending through the false bottom, said lower compartment having a transverse partition at one side of the percolator tube for preventing a portion of the water in the compartment from passing upward through the tube to cause the percolator to tilt when overbalanced by the said portion of water, and means in connection with the lower compartment for varying the pressure at which the water will be forced upward through the percolator tube.

PHILIP MALCAMP.